Jan. 13, 1931.  J. MAAS  1,788,921
ADVERTISING DEVICE
Filed Nov. 25, 1929

INVENTOR
Julian Maas.
ATTORNEY

Patented Jan. 13, 1931

1,788,921

UNITED STATES PATENT OFFICE

JULIAN MAAS, OF ST. LOUIS, MISSOURI

ADVERTISING DEVICE

Application filed November 25, 1929. Serial No. 409,672.

This invention relates to a certain new and useful improvement in advertising devices and has for its object the provision of an advertising device which is of simple construction, which may be cheaply manufactured, and which is efficient in the accomplishment of its intended functions.

And with the above and other objects in view, my invention resides in the novel features of form, construction, arrangement, and combination of parts hereinafter described and pointed out in the claims.

In the accompanying drawing,—

Figure 1:
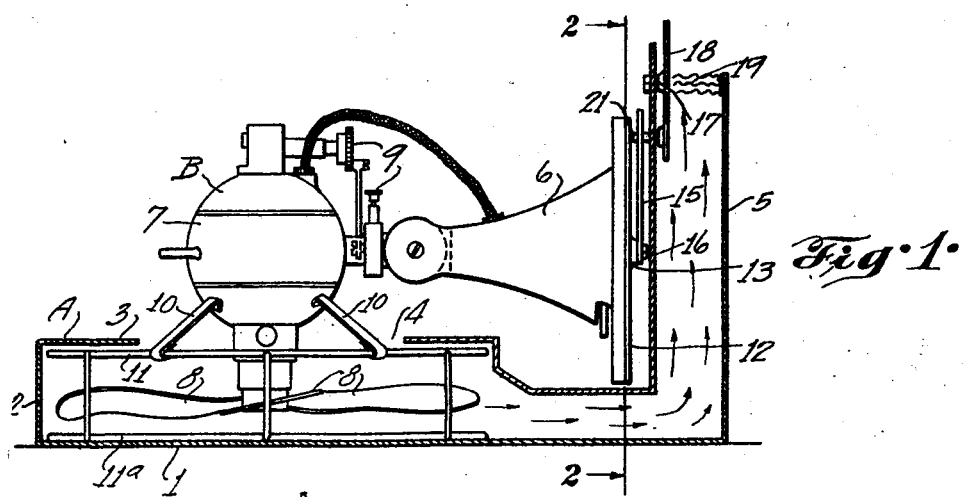
Figure 1 illustrates, partly in side elevation and partly in vertical section, an advertising device embodying my invention.
Figure 2:
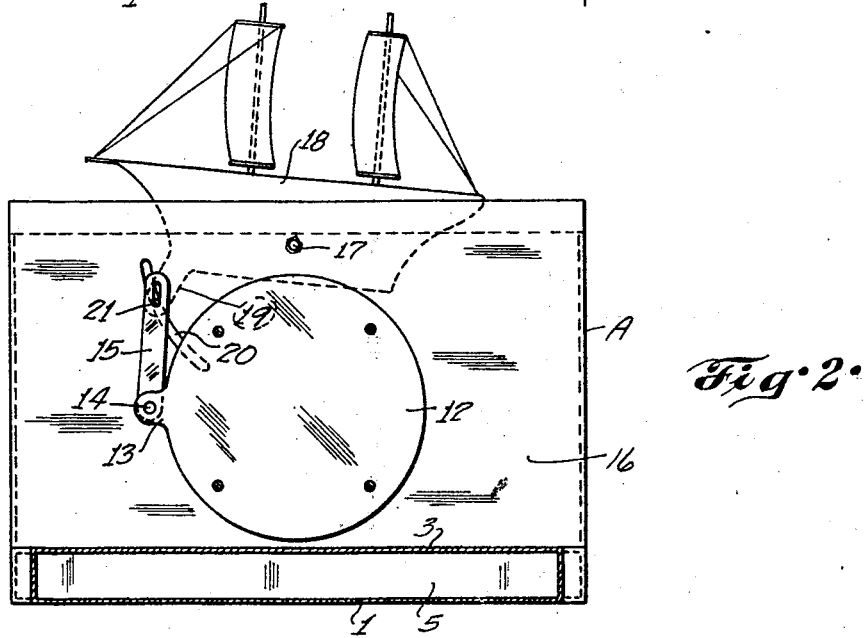
Figure 2 is a sectional elevation of the device approximately on the line 2—2, Figure 1.

Referring now more in detail and by reference characters to the drawing, which illustrates practical embodiments of my invention, A designates a suitable housing adapted to rest upon a table, counter, or other place of support, and comprising a bottom wall 1, a side wall 2, and a top wall 3, the latter being apertured, as at 4, for purposes presently appearing. Suitably conjoined or otherwise connected to the bottom wall 1, is an upstanding front wall 5, upon which, while not here specifically shown, may appear any desired advertising matter or the like.

B designates an oscillatory electric fan of any suitable standard type and construction, the same including, as is common, a base 6, a motor casing 7, an annular series of blades 8 suitably mounted for rotation upon the motor shaft, and means, such as the expedients or instrumentalities 9 shown, for effecting oscillatory movement of the motor-casing 7 and blades 8 relatively to the base 6. Inasmuch as the means 9, in and of itself, forms no part of my present invention, and inasmuch further as such means is of common type well known in the electrical art, a detail description thereof is here omitted.

Suitably secured, as by rigid connecting strips 10, to the motor-casing 7, is a skeleton frame 11 of suitable strength and rigidity enclosing for rotation the series of fan-blades 8, the frame 11 and its enclosed blades 8 being suitably disposed, as shown, within the housing A with the front wall 11a of the frame 11 downwardly presented and resting flatwise on the housing base-wall 1 and with the motor-casing 7 presented upwardly and projecting exteriorly of the housing A through the aperture 4 provided for the purpose in the housing top-wall 3. With the fan B so disposed, its base 6 is presented laterally toward and approximately at right angles to the upstanding wall 5, and suitably fixed flatwise upon the outer face of base 6, is a disk 12 of heavy card-board or other suitable material, provided with a radial ear 13, pivotally connected to which, as at 14, is a link 15.

Suitably conjoined to the housing top-wall 3 and upstanding in spaced parallelism with the wall 5, is a rear wall 16, pivotally, as at 17, supported upon which for oscillation, is a member 18 which may partake of any desired configuration for purposes of attracting attention to the device and the advertising matter displayed, such member, in the present instance, representing and having the outline contour of a ship. Forming part of the member 18, is a projecting finger 19, extending rearwardly from which and adapted to work in a suitable arcuate slot 20 provided for the purpose in the rear wall 16, is a pin 21 to which, in turn, the link 15 is suitably slotwise pivotally connected.

Thus I reverse or upset the fan B for utilization of its base 6 in effecting rocking or oscillatory movement of the attention-attracting member 18, the base 6, through the means or instrumentalities 9, being oscillatorily actuated on rotary movement of the motor enclosed within the casing 7 and such oscillations being, in turn, imparted to the attention-attracting member 18 through and by the link 15.

To further the realism of the present display, a suitable plurality of sections 19 of suitably colored tissue-paper or other desirable material its fixed at an end to the wall 5 to loosely float in suitable adjacence to the member 18, a wavy motion being imparted thereto by the air-currents created by the revolving series of fan-blades 8 and led to such sheets through the chute provided by and between the upstanding spaced walls 5, 16.

The device as a whole may be cheaply manufactured and assembled and has been found exceedingly efficient in the performance of its intended functions.

Figure 3:
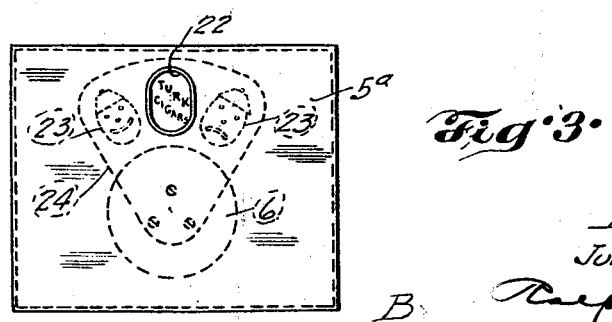
Figure 3 is a front elevational view of a slightly modified advertising device embodying my invention.

In the modified device of Figure 3, I omit the wall 16 and provide the housing front wall 5a with a suitable aperture 22, through which, for attention-attracting purposes, pictures or other desired matter, such as the so-called funny-faces 23, borne by a preferably angular section 24 disposed flatwise with relation to, and fixed at its apex directly upon, the outer face of the fan-base 6, are alternately visually exposed on the oscillations of the base 6.

It is to be understood that changes in the form, construction, arrangement, and combination of the several parts of the device may be made and substituted for those herein shown and described without departing from the nature and principle of my invention.

Having thus described my invention, what I claim and desire to secure by Letters Patent is:

1. An advertising device including, in combination, an upstanding wall, an attention-attracting member mounted for movement on said wall, and means including an oscillatory electric fan having its base presented towards said wall and operatively connected to said member for oscillatorily actuating the same.

2. An advertising device including, in combination, an upstanding wall, an attention-attracting member mounted for movement on said wall, and means for oscillatorily actuating said member relatively to said wall, said means comprising an oscillatory electric fan having the shaft of its motor disposed in parallelism with said wall and its base member presented towards said wall and operatively connected to the attention-attracting member.

3. An advertising device including, in combination, a housing comprising a base wall and an upstanding wall, an attention-attracting member mounted for movement on the upstanding wall, a frame disposed upon said base-wall, and means for oscillatorily actuating said member relatively to said upstanding wall, said means comprising an oscillatory electric fan supported upon said frame and having the shaft of its motor disposed in parallelism with and its base member presented towards said upstanding wall and operatively connected to the attention-attracting member.

4. An advertising device including, in combination, an upstanding wall, an attention-attracting member mounted for movement on said wall, and means for oscillatorily actuating said member relatively to said wall, said means including a motor located adjacent to and having its shaft disposed in parallelism with the wall, a base-member disposed intermediate and at right angles to the motor-shaft and said wall and having connection with the attention-attracting member, and instrumentalities between the motor-shaft and base-member for oscillatorily actuating the base-member on rotary movement of the motor shaft.

5. An advertising device including, in combination, a housing comprising a base-wall and upstanding rear and front spaced parallel walls, an attention-attracting member pivoted for rocking movement upon the rear upstanding wall, and means for rocking said member, said means comprising a motor mounted over said base wall and having its shaft presented in parallelism with said real wall, a base-member presented toward and at right angles to said rear wall, instrumentalities between the motor-shaft and base-member for oscillatorily actuating the base-member on rotary movement of the motor-shaft, and a link-connection between the base and attention-attracting members.

6. An advertising device including, in combination, a housing including a base wall and upstanding rear and front spaced parallel walls, an attention-attracting member pivoted for rocking movement upon said rear wall, a vibratory member disposed between said front wall and said member, and means for rocking said member and vibrating said vibratory member, said means including an oscillatory electric fan mounted over said base wall and having its motor shaft presented in parallelism with said rear wall, its base presented toward and at right angles to said rear wall, and its blades disposed for directing currents of air between said front and rear walls, and a link connection between the base and attention-attracting members.

In testimony whereof, I have signed my name to this specification.

JULIAN MAAS.